Nov. 9, 1937.  E. D. DOYLE  2,098,574
ELECTRICAL MEASURING SYSTEM
Filed Feb. 1, 1935   2 Sheets—Sheet 1
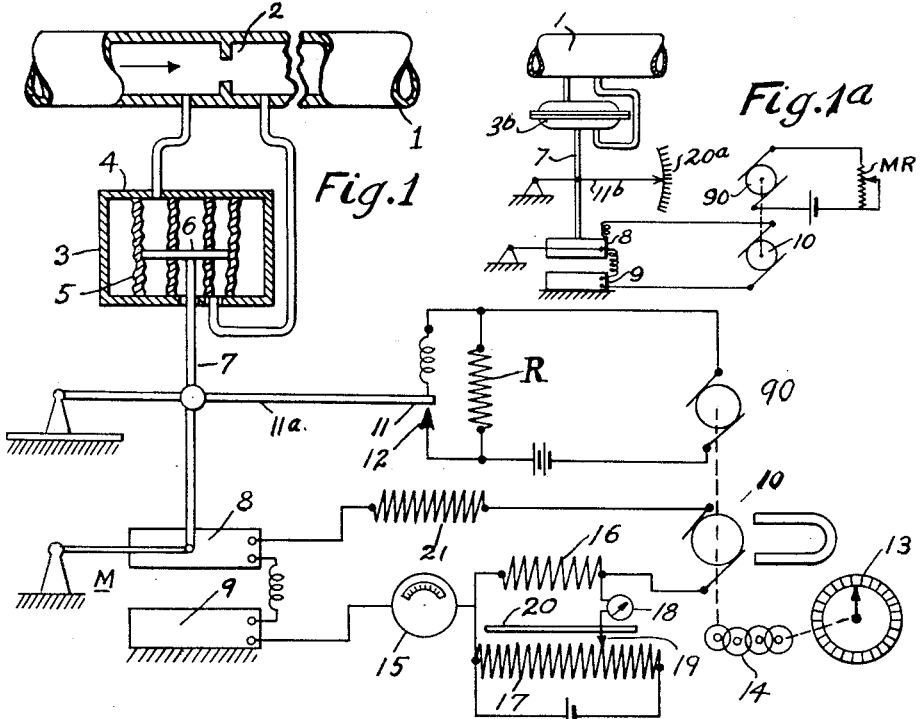
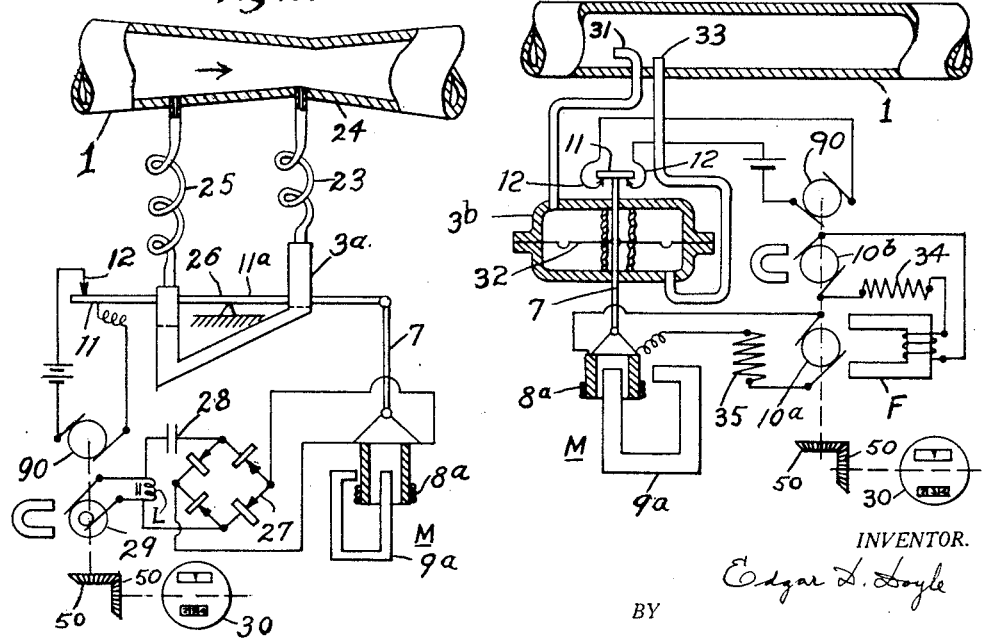
INVENTOR.
Edgar D. Doyle
BY
Cornelius D. Ehret
ATTORNEY.

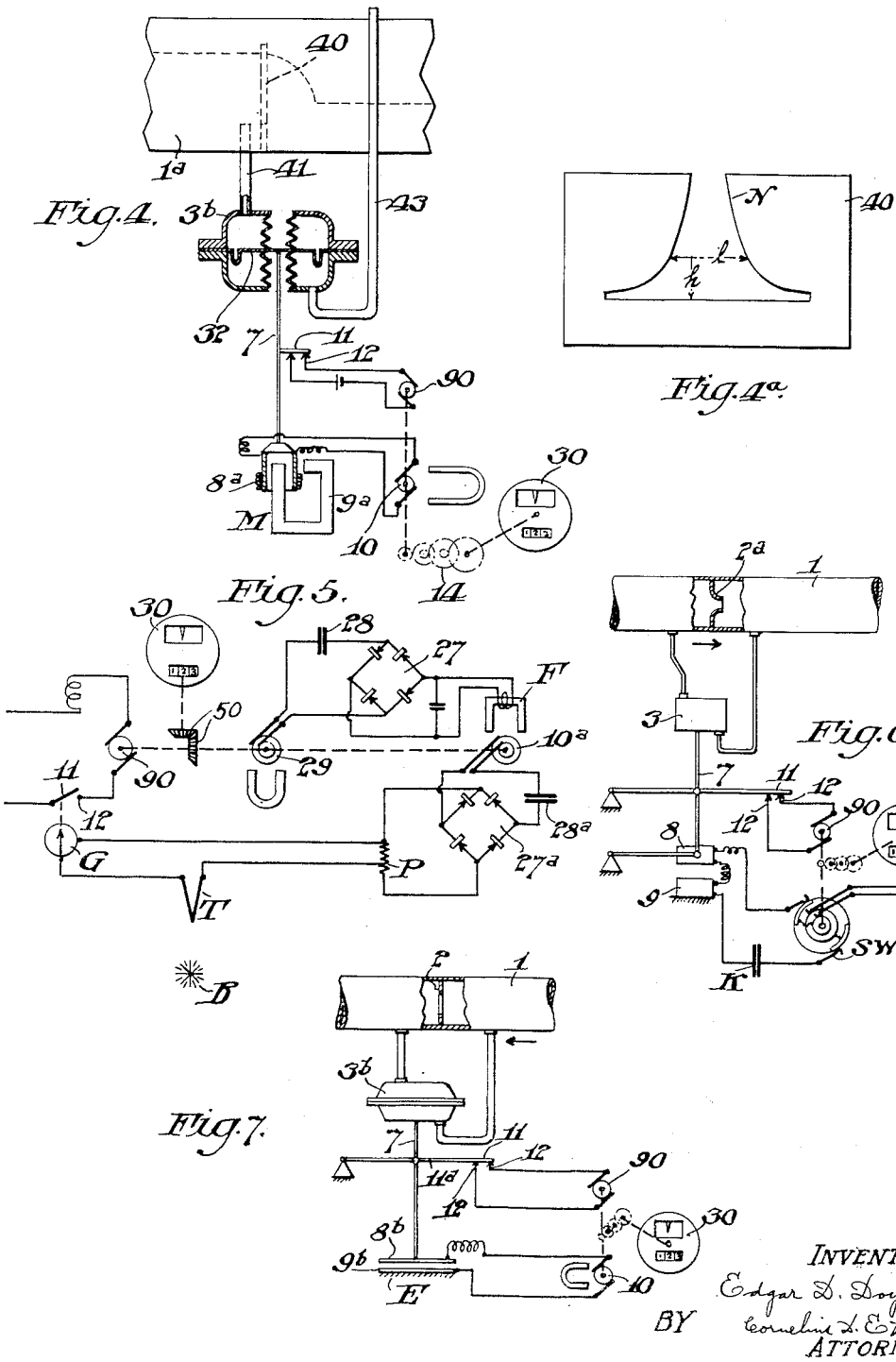

Patented Nov. 9, 1937

2,098,574

UNITED STATES PATENT OFFICE 2,098,574

ELECTRICAL MEASURING SYSTEM

Edgar D. Doyle, Philadelphia, Pa., assignor to Leeds and Northrup Company, Philadelphia, Pa., a corporation of Pennsylvania Application February 1, 1935, Serial No. 4,587

18 Claims. (Cl. 73—206)

My invention relates to systems for measuring, recording, or indicating the varying magnitude of a physical, electrical, or other condition, and particularly the rate of flow of a fluid.

In accordance with my invention, a force whose magnitude varies with change in magnitude of the condition under measurement, in accordance with a definite law, is brought in opposition to an electrical force whose magnitude varies with the speed of a rotating body in accordance with substantially the same law, and the speed of the body is controlled to maintain balance of these forces.

More particularly, a differential pressure produced by the flow of a fluid is balanced against the force produced by an electromagnetic device energized from a small motor-generator whose speed is controlled by unbalance of the two forces to restore balance so that the speed of the motor is a linear function of the rate of flow of the fluid.

My invention further resides in the systems and features of combination hereinafter described and claimed.

For an understanding of my invention, reference is to be had to the accompanying drawings in which—

Figs. 1 to 4 diagrammatically illustrate various modifications for measuring flow;

Fig. 4a is a detail view of a weirplate used in the system of Fig. 4;

Fig. 5 illustrates another modification for measurement of temperature;

Figs. 6 and 7 illustrate further modifications of the invention.

Referring to Fig. 1, in the pipe or conduit 1 is included an orifice plate 2, or equivalent, to produce a drop in pressure which is a function of the rate of flow of the fluid. The pressure-responsive device 3 comprises a bellows 4 whose interior is in communication with the conduit 1 on the upstream side of the orifice plate 2, and a bellows 5 whose interior is in communication with conduit 1 on the downstream side of the orifice plate. The two pressures on opposite sides of the orifice plate are thus brought into opposition and the resultant differential pressure is effective to move, or to tend to move, downwardly the plate 6 and the rod 7 connected thereto. Specifically, the force moving, or tending to move, the rod 7 downwardly varies as the square of the rate of flow of fluid through conduit 1.

The lower end of rod 7 is mechanically connected to a coil 8 disposed in inductive relation to the stationary coil 9. Both coils are connected to a generator 10 driven by motor 90. As the force tending to effect relative movement of the coils 8 and 9 of the electromagnetic device M is substantially proportional to the product of the current in each of the coils, and since the current in each of the coils is a substantial linear function of the speed of the generator 10, which is of a type having constant field excitation, as a magneto, it follows that the force produced by the electromagnetic device on the rod 7 varies as the square of the speed of the generator 10. The coils are so poled that the magnetic effect moves, or tends to move, the rod upwardly in opposition to the force produced by the pressure-differential device 3.

The speed of the motor 90, which may be energized from any suitable source of current, as a commercial power line supplying alternating or direct current, is controlled by a switching device, including the contacts 11 and 12, one of which is stationary and the other of which is carried by the member 11a movable with rod 7.

For any given rate of flow through the conduit 1, the contact 11 intermittently engages contact 12 to maintain speed of the motor 90 at the value for which the force developed by the electromagnetic device 8, 9 balances the force produced by the pressure-responsive device 3. The contacts may make and break the motor circuit or, as indicated may make and break a circuit of low resistance in shunt to a suitably high resistance R.

Assuming that the rate of flow increases, the periods, during which the contacts 11 and 12 remain in engagement, are of longer duration, and the speed of motor 90 increases until it attains the higher value necessary to restore balance between the opposing forces developed by the electromagnetic device 8, 9 and the pressure-responsive device 3. Conversely, if the rate of flow decreases, the periods of engagement of the contacts 11 and 12 are shortened and the speed of motor 90 decreases until the opposing forces on rod 7, or equivalent, again balance.

Since the force produced by the device 3 is proportional to the square of the rate of flow of fluid, and the opposing force produced by the electromagnetic device 8, 9 is proportional to the square of the speed of generator 10, maintenance of balance of these forces establishes a linear relation between the rate of flow and the speed of the generator 10. Thus, it is possible, by simple mechanism responsive to the speed of the motor 90 directly to integrate the flow of fluid through conduit 1; for example a simple revolution counter 13, calibrated in units of flow, may be driven from motor 90, as through a gear train 14.

Instantaneous values and rate of flow can be read from a tachometer, of any suitable construction, driven from the shaft of motor 90, or, since the current supplied by generator 10 is a linear function of its speed, by an indicating or recording ammeter 15, calibrated in terms of rate of flow. If the meter 15 is an ampere-hour meter, it can be calibrated in terms of flow to give a reading of integrated flow. Particularly for procuring readings of the rate of flow at a more or less remote point, there may be included in the output circuit of the generator 10 a resistance 16. Since the speed of generator 10 is a linear function of the rate of flow, the current through this resistance, and therefore the voltage drop across it, varies linearly with flow. This voltage may be measured by a potentiometer, preferably one of the self-balancing type, as shown in Squibb Patent No. 1,935,732. Specifically, one terminal of resistor 16 is connected to a potentiometer resistance 17, and the other terminal of resistance 16 is connected through a galvanometer 18, or equivalent, to the potentiometer slidewire contact 19. As usual, in potentiometer practice, the contact 19 is moved until there is no deflection of the galvanometer 18. A linear scale 20, calibrated in units of flow, may be provided for a direct indication of the rate of flow. In addition, or alternatively, the rebalancing movement of the slidewire contact may, as in the aforesaid Squibb Patent No. 1,935,732, effect movement of a recorder pen or marker.

Although responsive device 3 produces a force which is a non-linear function of the rate of flow of fluid, the recording, indicating or integrating devices may be of simple type whose construction does not include rectifying cams, non-linear scales, or the like.

Substantially to eliminate the effect of temperature, there is preferably included in series between the generator 10 and the coils 8, 9, a resistance 21 whose magnitude is high relative to any changes in resistance, due to temperature, of the other circuit components, and which is of material having low or negligible resistance-temperature coefficient.

Referring to Fig. 2, the pressure-responsive device 3a is a tilting manometer of usual type whose low-pressure side is connected, as by the flexible tube 23, to the throat of the Venturi 24. The high pressure side is connected by the flexible tube 25 to conduit 1 on the upstream side of the throat 24.

The differential pressure varying as the square of the rate of flow of fluid through pipe 1 and acting upon the manometer tends to effect its movement in clockwise direction about the pivot 26. This movement is resisted by the force produced by the magnetic device M comprising a coil 8a on a movable form connected to rod 7 and disposed in the magnetic field of a constant strength, such as produced, for example, by the permanent magnet 9a or an electromagnet energized from a source of substantially constant direct current. The coil 8a is connected to the output terminals of a rectifier bridge 27 whose input terminals are connected to the condenser 28 and the alternator 29 in series. Preferably, the rectifier elements are of the copper oxide, or other dry type.

The motor 90 for driving the alternator is controlled, as in the system of Fig. 1, by contacts 11 and 12, one of which is movable in response to unbalance between the pressure-responsive device and the electromagnetic device. The field excitation of the alternator is constant and its voltage is, therefore, a linear function of the speed of the motor 90, and also of the frequency. The current applied to the coil 8a, being dependent both upon the generator voltage and frequency, therefore varies as the square of the speed of the motor 90; more specifically, as the speed of the generator increases its output voltage increases, and to the higher frequency current the condenser 28 offers less reactance. Instead of or in addition to the series condenser 28 there may be utilized a shunt inductance L whose shunting effect decreases as the frequency increases, and vice-versa. Accordingly, as in the system of Fig. 1, since the two opposing forces are maintained in balance, the speed of the motor 90 is a linear function of the rate of flow, and simple indicating, recording, or integrating mechanisms may be used, as explained in connection with Fig. 1 or, as indicated in Fig. 2, a speedometer 30, such as used on automobiles, may be driven from motor 90 as by gears 50, 50, directly to indicate instantaneous and integrated flow.

Referring to Fig. 3, the pressure-responsive device 3b is of the diaphragm type, and a Pitot tube arrangement is utilized to provide a differential pressure which follows the variations in rate of flow of fluid in pipe 1.

The upstream tube 31 is connected to the chamber on the upper side of the diaphragm 32, and the downstream tube 33 is connected to the chamber of the pressure-responsive device 3b below the diaphragm 32. The force varying with flow which moves, or tends to move the rod 7 downwardly, is opposed by an electromagnetic device M, such as shown and described in the system of Fig. 2.

The current to the coil 8a is supplied from a direct current generator 10a whose field, instead of being constant as in the prior modifications, is a function of the speed of motor 90 and, specifically, is supplied by generator 10b driven by motor 90 and having constant field excitation. In order that the field excitation for generator 10a shall be directly proportional to the exciting current, the field structure may be of magnetic materials having different saturation points; specifically, the laminations may be of different materials so that, in the assembly core structure, the proportions are about:

| | Per cent |
|---|---|
| Magnetic iron | 55 |
| 45–55 permalloy | 25 |
| 78½ permalloy | 10 |
| Silicon steel | 10 |

The output voltage of the generator 10a is dependent upon its armature speed which is a substantially linear function of the speed of motor 90 and also upon its field excitation which is also substantially a linear function of the speed of motor 90. The current supplied thereby to the coil 8a therefore varies as the square of the speed of motor 90. As in the preceding modifications, a differential pressure varying as the square of the rate of flow is balanced against a force, produced by an electromagnetic device, which varies as the square of the speed of a motive device, to establish a linear relation between the speed of the device and the rate of flow.

Resistances 34 and 35 may be used to minimize or substantially eliminate errors due to temperature changes, and correspond in magnitude and function to the resistance 21 of Fig. 1. As the current in the output circuit in the generator 10b is a linear function of flow, any of the current responsive devices for indicating, integrating or recording flow, mentioned in connection with Fig. 1, may be included in this circuit.

It is, of course, understood that the orifice plate 2 of Fig. 1, the Venturi of Fig. 2, and the Pitot tube of Fig. 3 are interchangeable; in fact, other suitable devices, such as a flow nozzle, may be used; similarly, the several pressure-responsive devices shown may be used interchangeably in the several systems, as apparent to those skilled in the art.

While preferably the control of the speed of motor 90 is automatic, it is feasible, particularly for obtaining readings of the instantaneous rate of flow, to vary the speed of motor 90 manually, as by a rheostat MR, Fig. 1a, to obtain the speed for which the two opposing forces acting on rod 7 or equivalent are in equilibrium as indicated, for example, by a pointer 11b movable by or with rod 7 with respect to a stationary scale 20a.

In the system shown in Fig. 4, a weirplate 40 disposed in the channel box 1a is provided with an opening N and a tube 41 is disposed on the upstream side of the plate with its upper end at substantially the level of the bottom of the opening or notch N. The tube 41 is connected to one side of a pressure-differential device of any suitable type whose other side is at atmospheric pressure. As shown, the diaphragm type of Fig. 3 may be used, the high pressure chamber connects to pipe 41, and the low pressure chamber is connected to atmosphere as by pipe 43.

The relation between the flow or quantity of fluid passing over the weir and the head or differential pressure is expressed by the formula—

$$Q = K_1 (1\sqrt{h}) h$$

Where 1 is length of weir at height $h$ above the bottom of the notch (Fig. 4a).

By making $$1\sqrt{h} = K_2$$

the formula becomes $$Q = K_1 K_2 h$$

that is: Q, the rate of flow, is directly proportional to the head or differential pressure.

The force tending to move the rod 7 downwardly is opposed by the reaction between the magnetic field of coil 8a and the constant magnetic field of magnet 9a, or an equivalent electromagnet. The current of coil 8a supplied by the generator 10 driven by motor 90 is directly proportional to the speed of the motor, and therefore the upwardly acting force on member 7 is directly proportional to the generator speed.

As in the prior modifications, the speed of the motor 90 is controlled as by the contacts 11, 12, to maintain the two forces in equilibrium for the different rates of flow so that the speed of motor 90 is a linear function of the rate of flow, and can be integrated by simple mechanisms, for example, a speedometer 30 driven from the shaft of motor 90 by a suitable gear train 14. Though in the modification there is no rectification of a non-linear law necessary, the translation of a differential pressure into speed by the combination of the generator 10 and magnetic device M facilitates at least the integration of flow.

In the system shown in Fig. 5, the thermocouple T receives heat by radiation from a body B whose temperature is to be measured. The voltage developed by the thermocouple is not a linear function of the temperature of the body but varies in accordance with a fourth power law.

The motor 90 drives an alternator 29 to supply current to the field F of a second alternator 10 also driven by motor 90, through a circuit including condenser 28 and a rectifier 27. The field excitation of generator 10a therefore varies as the square of the speed of motor 90. The generator 10a supplies current to the potentiometer resistance P through a circuit including condenser 28a and rectifier 27a. With constant field excitation, the current to resistance P would vary as the square of the speed but since the field excitation also varies as the square of the speed, the current through resistance P varies as the fourth power of the speed of the generator.

The voltage across all or part of resistance P is opposed to the thermocouple voltage, the contacting galvanometer G or equivalent responding to unbalance of these voltages to control the speed of motor 90, as by contacts 11 and 12, to maintain balance. Thus there is established a linear relation between the temperature of the body B and the speed of motor 90, and any simple speed responsive devices, such as illustrated and described in connection with the preceding modifications may be used to indicate, record or integrate.

The modification shown in Fig. 6 is similar to the arrangement of Fig. 1 except that the current to the coils 8 and 9 of the electromagnetic device M is supplied from any suitable source S of constant or direct current instead of from a generator driven by the motor 90. Between the source S and the coils 8, 9 is interposed a condenser K and a reversing switch SW driven by the motor 90.

In this arrangement, the current flowing through the coils is substantially proportional to the motor speed and the electromagnetic reaction between them is substantially proportional to the square of the motor speed. The motor speed is controlled as in prior modifications to maintain balance of the opposing forces so that the motor speed is a linear function of the rate of flow and may be integrated by a simple revolution countercalibrated in units of flow, or, as indicated, both integrated and instantaneous rate of flow may be shown by a speedometer 30 driven by motor 90.

In the modification shown in Fig. 7, the electrical device for opposing the force produced by the pressure-differential device 3b, or equivalent, is of the electrostatic type instead of the electromagnetic type. The movable plate 8b is mechanically connected to rod 7, and is disposed adjacent but spaced from the fixed plate 9b. The two plates are connected to the opposite terminals of the generator 10 which may be either an alternator or a direct current generator. If it is the latter, it should be a high voltage machine; if it is an alternator, it should be a high voltage machine if directly connected to the plates, or it may be a low voltage machine and a step-up transformer introduced between the alternator and the plates 8b, 9b.

In all cases, the attraction between the two plates varies substantially as the square of the speed of motor 90. As the speed of motor 90 is controlled to maintain balance between this force and the force due to the pressure-differential device, the motor speed varies linearly with the rate of flow of fluid through pipe 1. The speedometer 30 driven from motor 90 can be calibrated to indicate instantaneous and/or integrated flow, or any of the other devices shown in prior modifications may be used to indicate, integrate or record.

While I have illustrated and described various specific arrangements, it is to be understood my invention is not limited thereto, but is co-extensive in scope with the appended claims.

For brevity and convenience in the claims, the term "exhibiting means" is used to comprehend an indicating, recording and/or integrating means.

I claim:

1. A system for determining the magnitude of a condition which comprises means for producing a force whose magnitude with respect to the magnitude of a condition under measurement follows a predetermined law of response, means for producing an electrical force whose magnitude with respect to the speed of rotation of a body substantially follows said law, means for effecting opposition of said forces, means for controlling the speed of rotation of said body to effect balance of said forces for the different magnitudes of said condition, and exhibiting means responsive to speed of rotation of said body.

2. A system for determining the magnitude of a condition which comprises means for producing a force varying with changes in magnitude of a condition in accordance with a law of response higher than the first power law, means for producing an electrical force whose magnitude with respect to the speed of rotation of a body substantially follows said law, means for effecting opposition of said forces, means for controlling the speed of said body to effect balance of said forces for different magnitudes of said condition, and exhibiting means responsive to speed of rotation of said body.

3. A system for determining the magnitude of a condition which comprises means for producing a force varying as the second power of the magnitude of a condition under measurement, means for producing an electrical force whose magnitude varies as the second power of the speed of a rotating body, means for effecting opposition of said forces, means for controlling the speed of said body to effect balance of said forces for the different magnitudes of said condition, and exhibiting means responsive to the speed rotation of said body.

4. A system for determining the magnitude of a condition which comprises means for producing a force whose magnitude with respect to the magnitude of a condition under measurement follows a non-linear law of response, means for producing an electric current whose magnitude is a linear function of the speed of a rotating body, means for producing by said current an electrical force whose magnitude with respect to the speed of said body substantially follows said non-linear law, means for effecting opposition of said forces, means for controlling the speed of said body to effect balance of said forces for the different magnitudes of said condition whereby the magnitude of said current varies as the first power of the magnitude of said condition, and exhibiting means responsive to the speed of rotation of said body.

5. A system for determining the magnitude of a condition which comprises means for producing a force whose magnitude with respect to the magnitude of a condition under measurement follows a non-linear law of response, means for producing an electric current whose magnitude with respect to the speed of a rotating body substantially follows said non-linear law, means for producing by said current a force varying linearly with respect thereto, means for effecting opposition of said forces, means for controlling the speed of said body to effect balance of said forces for the different magnitudes of said condition and exhibiting means responsive to the speed of rotation of said body.

6. A system for measuring the rate of flow of a fluid which comprises means for producing a force proportional to a differential pressure whose magnitude varies as the second power of the rate of flow, means for producing an electrical force whose magnitude varies as the second power of the speed of a rotating body, means for effecting opposition of said forces, means for controlling the speed of said body to effect balance of said forces, and means for measuring the speed of said body.

7. A measuring system comprising a generator, an electrical device energized from said generator and including a movable element, a device having a movable element responsive to the changes in magnitude of a condition, means for connecting said movable elements in opposition to form a balanceable system, means responsive to the condition of said balanceable system for controlling the speed of said generator to maintain balance of said movable elements for the different magnitudes of said first-named condition, and means for determining the magnitude of said first-named condition responsive to the speed of said generator.

8. A measuring system comprising a generator, an electromagnetic device energized from said generator and including a movable element, a device having a movable element responsive to the changes in magnitude of a condition, means for connecting said movable elements in opposition to form a normally balanced system, means for controlling the speed of said generator including means responsive to unbalance of said system, and exhibiting means responsive to the speed of said generator.

9. A measuring system comprising a generator, an electromagnetic device having inductively-related fixed and movable coils energized from said generator, a device having a movable element responsive to changes in magnitude of a condition, means for mechanically connecting said movable element in opposition to said movable coil to form a balanceable system, means responsive to the condition of said balanceable system for controlling the speed of said generator to effect equilibrium of said movable element and said movable coil, and means for determining the magnitude of said first-named condition responsive to the speed of said generator.

10. A measuring system comprising an alternator, an electromagnetic device energized from said alternator and having a movable element, a reactance in circuit with said alternator whereby the current in said electromagnetic device varies non-linearly with respect to the speed of said alternator, a device having a movable element non-linearly responsive to changes in magnitude of a condition, means for mechanically connecting said movable elements to form a balanceable system, means responsive to the condition of said balanceable system for controlling the speed of said alternator to effect equilibrium of said elements, and exhibiting means responsive to the speed of said alternator.

11. A measuring system comprising an alternator, a rectifier in circuit therewith, an electromagnetic device energized by the rectified alternator current and having a movable element, a reactance for varying the current to said device for different frequencies of the alternator current, a device having a movable element non-linearly responsive to changes in magnitude of a condition, means for mechanically connecting said movable elements to form a balanceable system, means responsive to the condition of said balanceable system for controlling the speed of said alternator to effect equilibrium of said elements, and means for determining the magnitude of said first-named condition responsive to the speed of said alternator.

12. A measuring system comprising two generators, a common driving means therefor, an electrical device energized from one of said generators, means for exciting the field of said one of said generators by the other of said generators, a device non-linearly responsive to changes in magnitude of a condition, means jointly responsive to said devices for controlling the speed of said common driving means, and means for determining the magnitude of said condition responsive to the speed of said driving means.

13. A flow measuring system comprising a generator, an electromagnetic device energized from said generator and including a movable element, a device having a movable element responsive to changes in the rate of flow of a fluid, means for connecting said movable elements in opposition, means for controlling the speed of said generator to maintain said movable elements in equilibrium for different rates of flow, and flow-exhibiting means responsive to the speed of said generator.

14. A flow measuring system comprising a generator, an electro-magnetic device energized from said generator and including a movable element, a device having a movable element responsive to changes in the rate of flow of a fluid, means for connecting said movable elements in opposition, means for controlling the speed of said generator to maintain said movable elements in equilibrium for different rates of flow, and integrating means calibrated in units of flow driven from said generator.

15. A flow measuring system comprising a generator having constant field excitation, an electromagnetic device having inductively-related fixed and movable coils energized from said generator, a device having a movable element responsive to changes in rate of flow of a fluid, means for connecting said movable element and said movable coil in opposition, means for controlling the speed of said generator to maintain said movable element and said movable coil in equilibrium for different rates of flow, and flow-exhibiting means responsive to the speed of said generator.

16. A flow measuring system comprising a generator whose field excitation is a function of the generator speed, an electromagnetic device having a coil energized from said generator and movable in a substantially constant magnetic field, a device having a movable element responsive to changes in rate of flow of a fluid, means for connecting said element and said movable coil in opposition, means for controlling the speed of said generator to maintain said movable element and said movable coil in equilibrium for different rates of flow, and flow-exhibiting means responsive to the speed of said generator.

17. A flow measuring system comprising an alternator, an electromagnetic device having a movable element, means energizing said element from said alternator by current whose magnitude varies substantially as the square of the speed of said alternator, a differential pressure device having a movable element responsive to changes in rate of flow of a fluid, means for connecting said elements in opposition to form a balanceable system, means responsive to the condition of said balanceable system for controlling the speed of said alternator to maintain said movable elements in equilibrium, and flow-exhibiting means responsive to the speed of said alternator.

18. A system for integrating the magnitudes of a condition which comprises means for producing a force whose magnitude with respect to said condition follows a predetermined law of response, means for generating an electrical force whose magnitude with respect to the speed of rotation of a body substantially follows said law, means for effecting opposition of said forces, means for controlling the speed of rotation of said body to maintain balance of said forces for the different magnitudes of said condition, and means for integrating the revolutions of said body.

EDGAR D. DOYLE.